(12) United States Patent
Lovasz (10) Patent No.: US 12,479,352 B1
(45) Date of Patent: Nov. 25, 2025

(54) MOUNTING DEVICE, SYSTEM, AND METHOD FOR ANCHORING AN ITEM TO A TRUCK BED

(71) Applicant: Essentially Engineered, LLC, Cheyenne, WY (US)

(72) Inventor: Jacob Lovasz, Westminster, CO (US)

(73) Assignee: Essentially Engineered, LLC, Cheyenne, WY (US)

( * ) Notice: Subject to any disclaimer, the term of this patent is extended or adjusted under 35 U.S.C. 154(b) by 0 days.

(21) Appl. No.: 19/301,286

(22) Filed: Aug. 15, 2025

(51) Int. Cl.
*B60P 7/00* (2006.01)
*B60P 7/08* (2006.01)

(52) U.S. Cl.
CPC .................. *B60P 7/0807* (2013.01)

(58) Field of Classification Search
CPC ........ B60P 7/083; B60P 7/0823; B60P 7/0807
USPC ......................................................... 410/101
See application file for complete search history.

(56) References Cited

U.S. PATENT DOCUMENTS

| 7,360,753 | B1* | 4/2008 | Lin | B60P 7/083 |
|   |   |   |   | 254/218 |
| 9,266,461 | B2* | 2/2016 | Schmier, II | F16B 2/065 |
| 11,820,277 | B2* | 11/2023 | Chou | B60P 7/083 |
| 2023/0256893 | A1* | 8/2023 | Emmerich | B60P 7/0846 |
|   |   |   |   | 410/100 |

* cited by examiner

*Primary Examiner* — Steven O Douglas
(74) *Attorney, Agent, or Firm* — Rogue.Law; Laura Schneider (57) ABSTRACT

A mounting device has a bracket having two ear portions. The bracket is couplable to a surface and rotatable relative to a first horizontal axis. A first pivot arm is coupled to a first one of the two ear portions. A second pivot arm is coupled to a second one of the two ear portions. The first and second pivot arms are rotatably coupled to the respective first and second ear portions relative to a second axis perpendicular to the first axis. The mounting device is configured to move between a first configuration and a second configuration. In the first configuration, the first and second pivot arms hang vertically relative to the surface.

19 Claims, 9 Drawing Sheets

MOUNTING DEVICE, SYSTEM, AND METHOD FOR ANCHORING AN ITEM TO A TRUCK BED

TECHNICAL FIELD

Embodiments herein are related devices and systems for anchoring items to truck beds.

BACKGROUND

Contractors, homeowner, and DIYers frequently use pickup trucks to transport equipment and goods to various locations. To transport these items, they must anchor or tie-down the items to the truck to ensure safe transport. It is common to use tie-down straps, many with ratcheting devices for tightening the strap, to accommodate items in a variety of shapes and sizes.

For those who frequently use tie-down straps, the process of anchoring the items to the truck bed can be cumbersome and tedious. It is also a burden to store ratcheting tie-down straps in a location that does not take up a lot of room in the truck bed when not in use. Users often end up tossing their tie-down straps into the back seat, where the straps become tangled or otherwise a hassle to use.

There thus remains a need for a mounting device, system, or method for anchoring an item to a truck bed in a more convenient manner, saves cargo space, and/or provides other new and useful features.

SUMMARY

An exemplary mounting device has a top region, a bottom region, a bracket having two ear portions, the bracket configured to couple to a surface and rotate relative to a first horizontal axis. A first pivot arm is coupled to a first one of the two ear portions. A second pivot arm is coupled to a second one of the two ear portions. The first and second pivot arms are rotatably coupled to the respective first and second ear portions relative to a second axis perpendicular to the first axis. The mounting device is configured to move between a first configuration and a second configuration, wherein, in the first configuration, the first and second pivot arms hang vertically relative to the surface.

An exemplary system for anchoring goods to a truck bed has the mounting device described in the preceding paragraph and a ratchet tie-down strap assembly coupled to the first and second pivot arms. The ratchet tie-down assembly has a ratchet system and a strap for anchoring goods to a truck bed.

An exemplary method of anchoring an item to a truck bed includes providing the mounting device previously described, the mounting device being a first mounting device; providing a ratchet tie-down strap assembly with a proximal end having a mounting pin, a strap, and a ratchet system for the strap; attaching the first mounting device to a side of a truck bed with the top region vertically above the bottom region; and coupling the proximal end of the ratchet tie-down strap assembly by passing the mounting pin through passages in distal ends of the first and second pivot arms.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Before turning to the invention described herein, it is useful to provide definitions and a general explanation of the invention. For the purpose of this document, the terms "top", "bottom", and "vertical" shall be understood in the usual sense, with "vertical" being defined by gravity, unless otherwise stated herein.

The Applicant, a leading designer and manufacturer of accessories for trucks, particularly non-commercial trucks, has recognized that, when it comes to cargo space in a truck bed, every square inch is precious, especially as pressures to increase truck efficiency, reduce fuel mileage, etc., increase. Therefore, to save this precious space, the Applicant has designed a mounting device and system that maximizes the space available in the truck bed when the mounting device and system are not in use, meeting a long-felt unmet need.

With reference now to FIGS. 1-7, an embodiment of a mounting device 100 is described, which may be referenced herein as "device".

In some embodiments, the mounting device 100 has a top region, a bottom region, and a bracket 106 having two ear portions, the bracket configured to couple to a surface and rotate relative to a first horizontal axis. The bracket 106 may be a u-shaped bracket. The bracket 106 may be configured to rotate relative to the surface.

In some embodiments, the mounting device 100 has a mounting plate 102, a swiveling u-shaped bracket 106, and a pivot pin 112 rotatably coupling at least one pivot arm 114, 116 to the u-shaped bracket 106, whereby the mounting device is configured to move between a first configuration and a second configuration, wherein, in the first configuration, the device 100 is configured to store an item in a hanging position adjacent the mounting plate 102, and wherein, in the second configuration, the device 100 is configured to attach to the item in an extended, swiveled, and tilted orientation relative to the mounting plate 102.

In some embodiments, the device 100 has a top region, a bottom region, a mounting plate 102 shaped and configured to attach to a truck bed (not shown), a u-shaped bracket 106, a first pivot arm 114, and a second pivot arm 116. The device 100 may be configured to provide both swivel (rotate about a first axis, such as a horizontal axis) and tilt (swing about a second axis, such as an axis skewed relative to the first axis) capabilities for an item coupled to the device 100.

The mounting plate 102 may have one or more means for attaching the device 100 to a truck bed. The means for attaching the device 100 may be a plurality of passages 104 as shown, shaped and configured to allow a user to bolt the device 100 to the side of a truck bed, or any other mounting means.

The u-shaped bracket 106 may have a base portion 122 and two ear portions 124, 126, and may be rotatably coupled to the mounting plate 102 relative to a first horizontal axis. The u-shaped bracket 106 may be shaped, mounted, and configured to provide 360-degree swivel capabilities for an item, such as a ratchet assembly 200 (see FIG. 8) coupled to the device 100. The u-shaped bracket 106 may be rotatably coupled to the mounting plate 102 using a bolt assembly 108 or any means known to those skilled in the art. The bolt assembly 108 or mounting means may define the swivel axis.

A first pivot arm 114 may be coupled to a first one 124 of the two ear portions, and a second pivot arm 116 may be coupled to a second one 126 of the two ear portions. The first and second pivot arms 114, 116 may be rotatably coupled to the respective first and second ear portions 124, 126 relative to a second axis perpendicular to the first axis.

Figure 1:
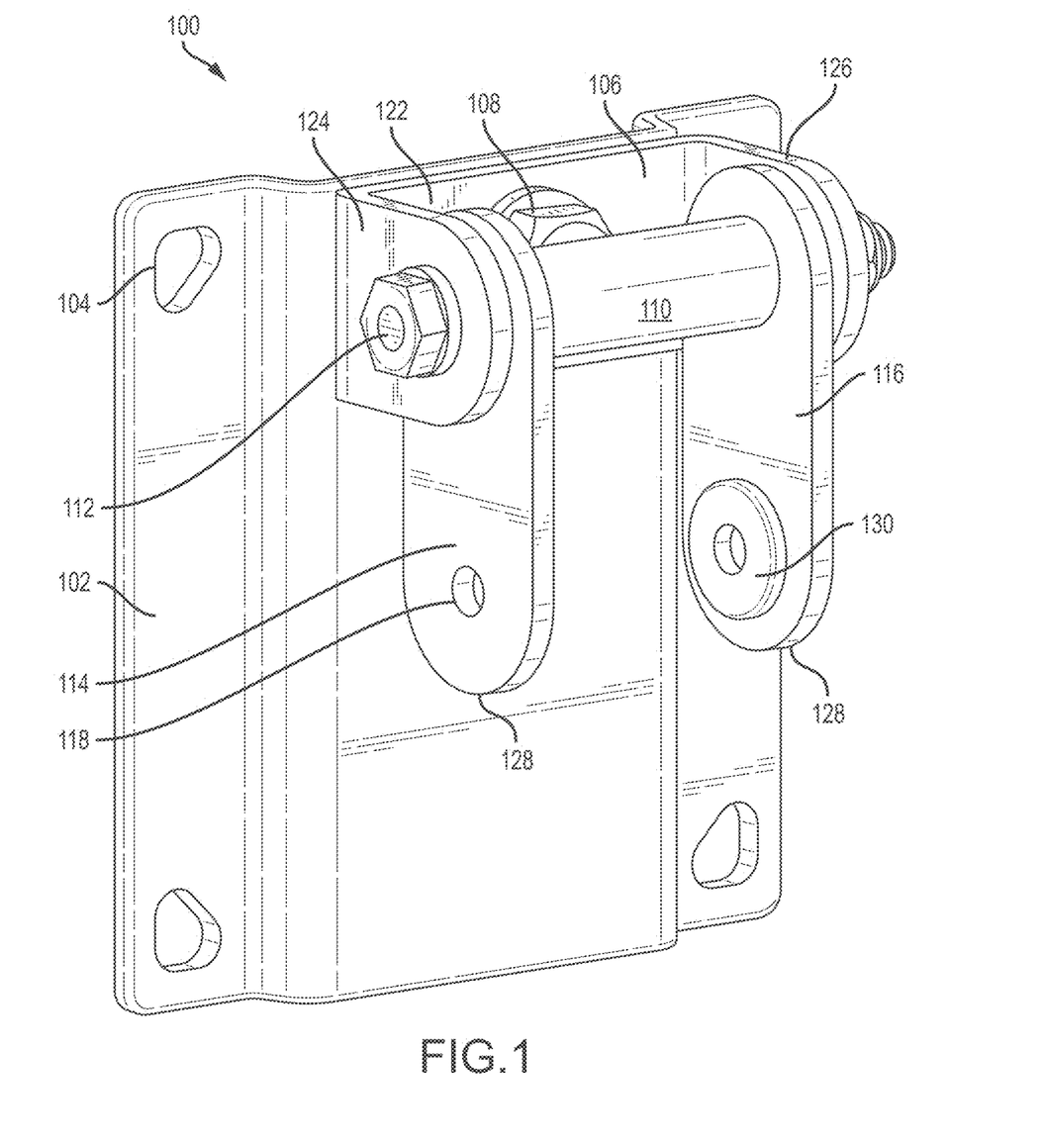
FIG. 1 is a front perspective view of an embodiment of a mounting device.
Figure 2:
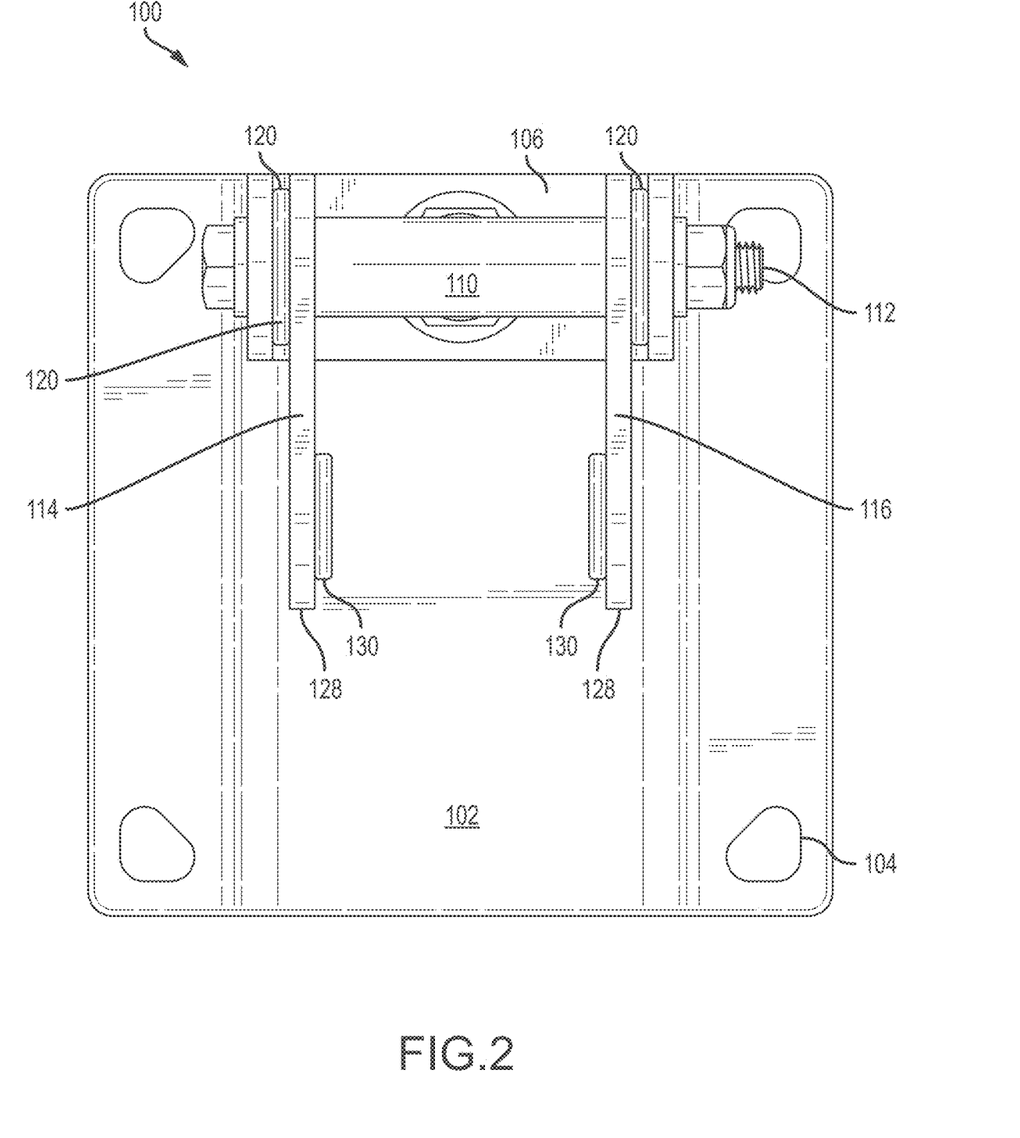
FIG. 2 is a front view thereof.
Figure 3:
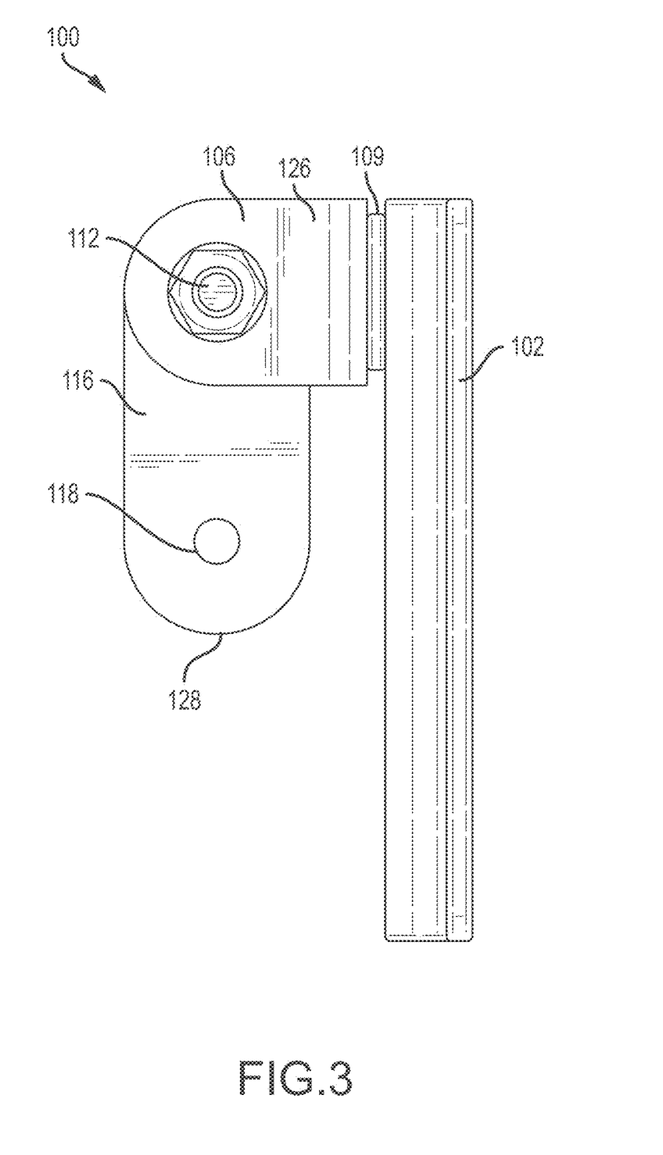
FIG. 3 is a right side view thereof.
Figure 4:
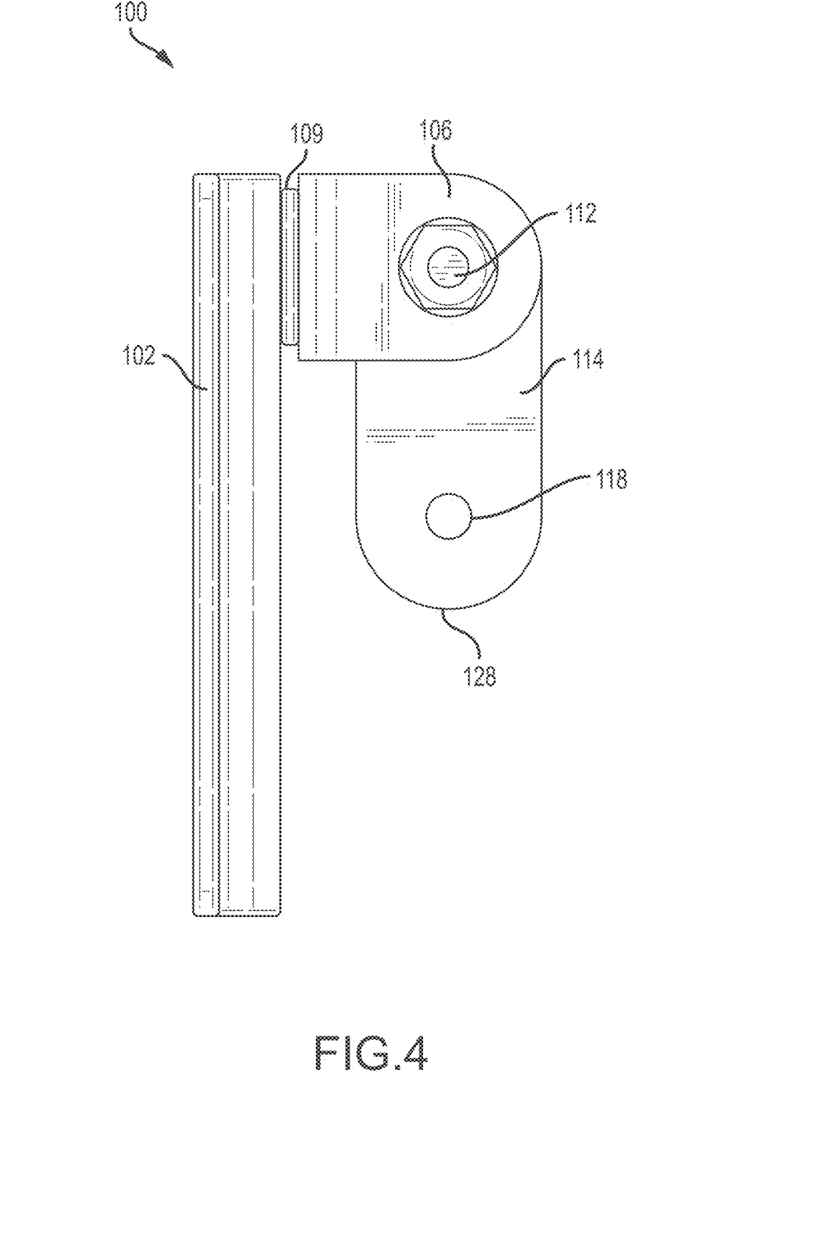
FIG. 4 is a left side view thereof.
Figure 5:
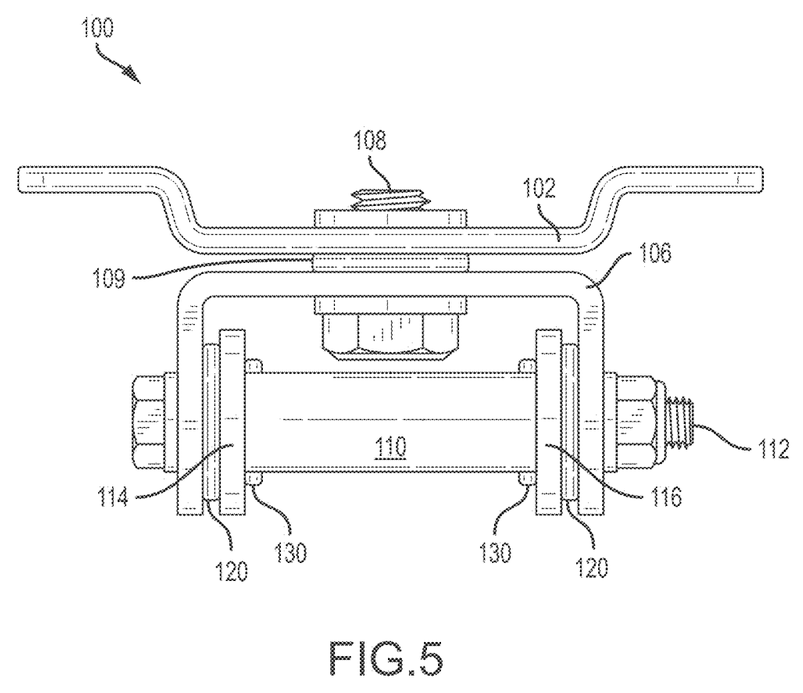
FIG. 5 is a top view thereof.
Figure 6:
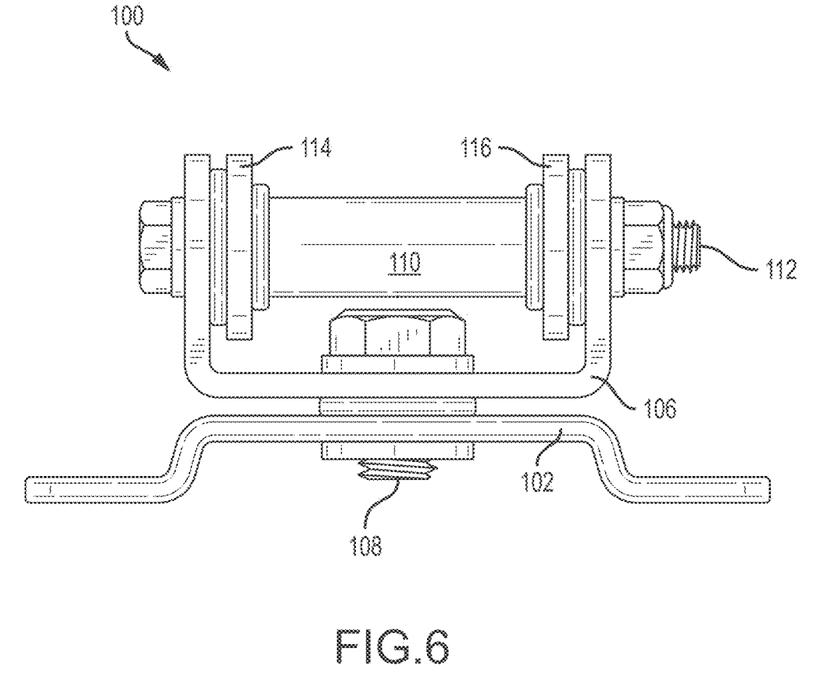
FIG. 6 is a bottom view thereof.
Figure 7:
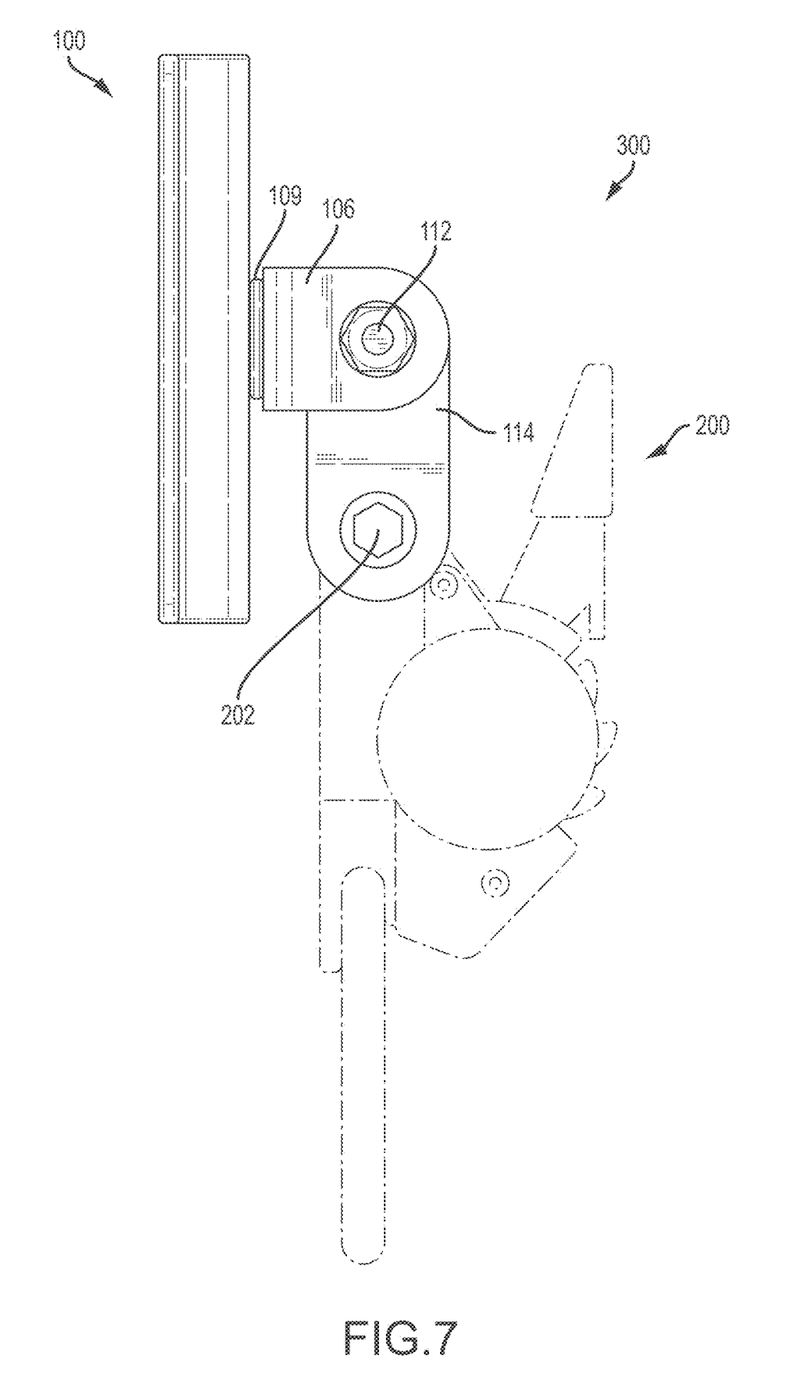
FIG. 7 is a left side view of an embodiment of an anchoring system in a first configuration.
Figure 8:
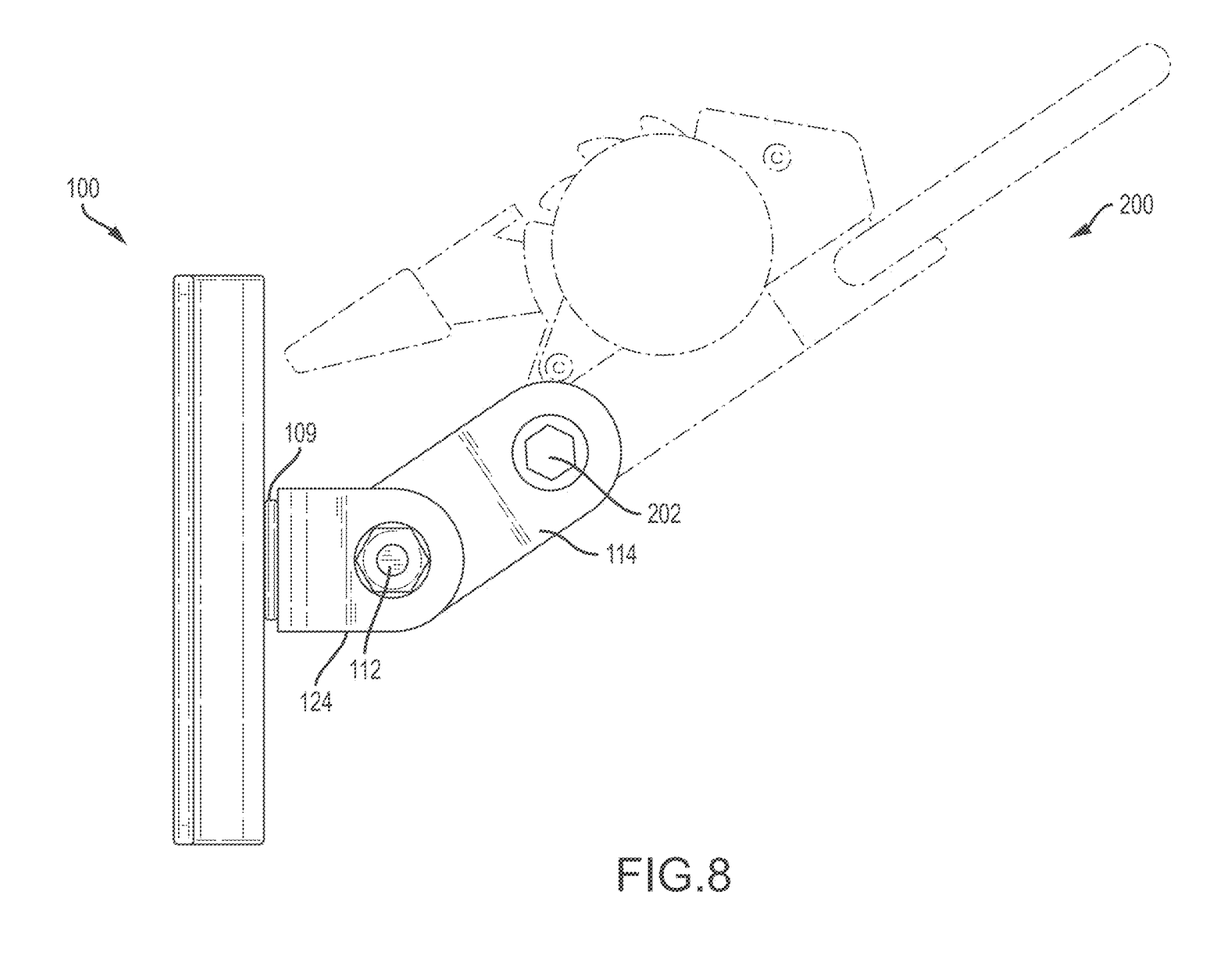
FIG. 8 is a left side view of the anchoring system in a second configuration.
Figure 9:
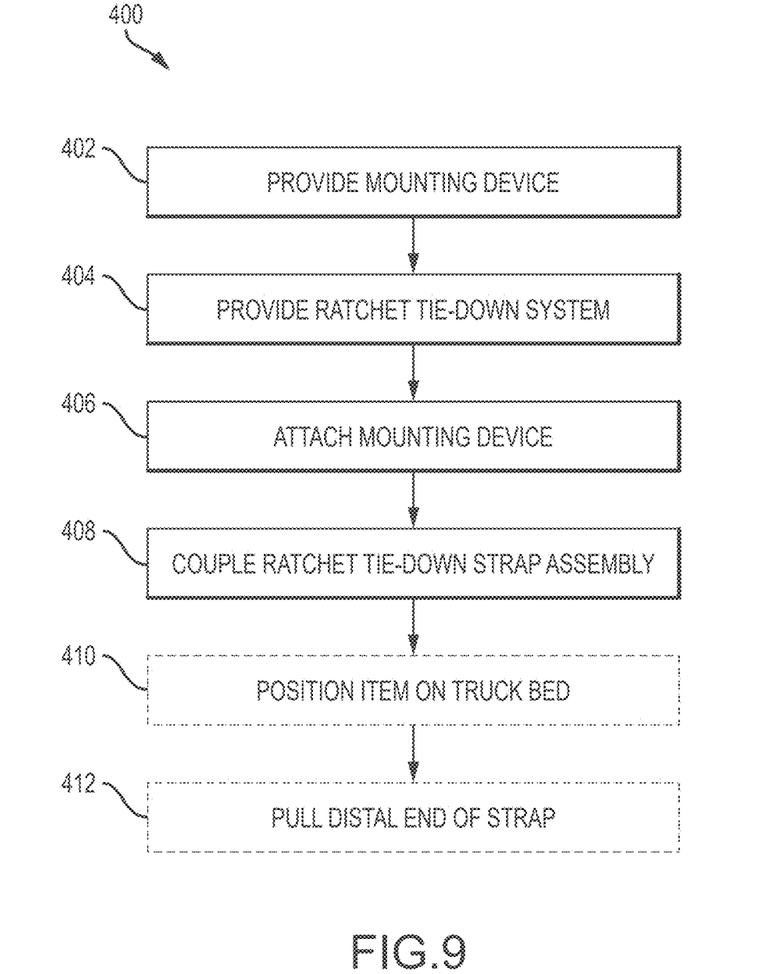
FIG. 9 is a flowchart of a method.

In some embodiments, a pivot pin 112 rotatably couples proximal ends of the first and second pivot arms 114, 116 to the u-shaped bracket 106. The pivot pin 112 may rotatably couple proximal ends of the pivot arms 114, 116 to the ears 124, 126 of the u-shaped bracket 106, to allow the arms 114, 116 to hang in a recessed configuration when not in use, and to move into an extended configuration when placed under tension, as shown in FIGS. 8-9. The pivot pin 112 may be a nut and bolt assembly.

With this, the mounting device 100 may be configured to move between a first configuration and a second configuration, wherein, in the first configuration, the first and second pivot arms 114, 116 hang vertically relative to the mounting plate 102. In the second configuration, a distal portion 128 of the pivot arms 114, 116 may be swiveled (about the first axis defined by the bolt assembly 108) and tilted (or swung) about the second axis defined by the pivot pin 112. In the second configuration, the distal portion 128 of the pivot arms 114, 116 may be further away from the plate 102 than in the first configuration, and the u-shaped bracket 106 may be swiveled relative to the first configuration.

In some embodiments, a spacer tube 110 encases a portion of the pivot pin 112 to maintain a desired spacing between the first and second pivot arms 114, 116. The spacer tube 110 may be provided to allow a distance between the pivot arms 114, 116 to be selected, so as to provide for a desired width between the pivot arms 114, 116. In some embodiments, the spacer tube 110 may be removable or removed and replaced with a different spacer tube 110 having a different size, such as a different length. In doing so, the device 100 may be configured to work with, for example, different sized tie-down ratchet strap assemblies.

In some embodiments, a spacer washer 120 may be positioned between the first one 124 of the two ear portions and the first pivot arm 114. A second spacer washer 120 may be positioned between the other ear portion 126 and the second pivot arm 116. The spacer washers 120 may be selected to maintain a desired spacing between the arms 114, 116 and/or to improve rotational movement of the arms 114, 116 to allow smooth tilting of an item attached thereto.

In some embodiments, each of the first and second pivot arms 114, 116 have passages 118 through distal ends 128 thereof, whereby the first and second pivot arms 114, 116 can receive a mounting pin (see pin 202 in FIG. 8) of a ratchet tie-down strap assembly 200.

In some embodiments, the first and second pivot arms 114, 116 are configured to rotate into a second configuration in response to a pulling force applied to the first and second pivot arms (contrast FIG. 9 with FIG. 8).

In some embodiments, the mounting plate 102, u-shaped bracket 106, and first and second pivot arms 114, 116 comprise at least one of the following: steel, stainless steel, HSLA steel, aluminum alloy, titanium alloy, and iron. The material may be selected to accommodate a desired strength of the device 100.

In some embodiments, when the mounting device 100 is attached to a truck bed in an upright position, the mounting device 100 is configured to store a ratchet tie-down strap assembly 200 in a hanging position. The hanging position may be a recessed vertical position relative to an in-use position. That is, the hanging position of the strap assembly 200 is selected to maximize usable space of the truck bed when the device 100 is not in use.

As illustrated in FIGS. 8-9, in some embodiments, a system 300 for anchoring goods to a truck bed is provided. The system 300 may have a mounting device 100 as described herein, and a ratchet tie-down strap assembly 200 coupled to the first and second pivot arms 114, 118. The ratchet tie-down assembly may have a ratchet system and a strap for anchoring goods to a truck bed as known to those skilled in the art.

In some embodiments, the ratchet tie-down assembly 200 is coupled to distal ends 128 (defined as ends away from the bracket 106) of the first and second pivot arms 114, 116 by a mounting pin 202 on a proximal portion (defined as the portion closer to the device 100) on the ratchet tie-down assembly 200, the mounting pin 202 passing through passages 118 in distal ends 128 of the first and second pivot arms 114, 116.

In some embodiments, the first and second pivot arms 114, 116 are configured to rotate into a second configuration (see FIG. 9) in response to a pulling force applied to the ratchet tie-down assembly 200, whereby the ratchet tie-down assembly is movable from a first hanging position as illustrated in FIG. 8 to a second extended, swiveled, tilted position as illustrated in FIG. 9. The first hanging position may be defined as a position recessed closer to the plate 102 than the second position.

With reference now to FIG. 10, a method 400 of anchoring an item to a truck bed is now described. The method 400 includes providing 402 a first mounting device the first mounting device being a mounting device 100 as described herein, and providing 404 a ratchet tie-down strap assembly with a proximal end having a mounting pin, a strap, and a ratchet system for the strap. The method 400 may include attaching 406 the first mounting device to a side of a truck bed with the top region vertically above the bottom region. The method 400 may include coupling 408 the proximal end of the ratchet tie-down strap assembly by passing the mounting pin through passages in distal ends of the first and second pivot arms.

The method 400 may include positioning 410 an item on the truck bed, and pulling 412 a distal end of the strap from the ratchet tie-down assembly. The method 400 may include at least one of: (a) attach the distal end of the strap to the item, or attach the distal end of the strap to the truck bed; (ratchet the ratchet tie-down strap assembly to tension the strap, whereby the first and second pivot arms rotate into a second configuration, and whereby the ratchet tie-down assembly is movable from a first hanging position to a second extended, swiveled, tilted position.

Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms-even if only the function or result is the same. Such equivalent, broader, or even more generic terms should be considered to be encompassed in the description of each element or action. Such terms can be substituted where desired to make explicit the implicitly broad coverage to which this invention is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, the disclosure of a "attachment mechanism" should be understood to encompass disclosure of the act of "attaching"—whether explicitly discussed or not—and, conversely, were there only disclosure of the act of "attaching", such a disclosure should be understood to encompass disclosure of a "attaching mechanism". Such changes and alternative terms are to be understood to be explicitly included in the description.

Moreover, the claims shall be construed such that a claim that recites "at least one of A, B, or C" shall read on a device that requires "A" only. The claim shall also read on a device that requires "B" only. The claim shall also read on a device that requires "C" only. The claim shall also read on a device that requires "A+B". The claim shall also read on a device that requires "A+B+C", and so forth.

Those skilled in the art can readily recognize that numerous variations and substitutions may be made in the invention, its use and its configuration to achieve substantially the same results as achieved by the embodiments described herein.

Accordingly, there is no intention to limit the invention to the disclosed exemplary forms. Many variations, modifications and alternative constructions fall within the scope and spirit of the invention as expressed in the claims.

The invention claimed is:

1. A mounting device, comprising:
a top region;
a bottom region;
a bracket having two ear portions, the bracket configured to couple to a surface and rotate relative to a first horizontal axis; and
a first pivot arm coupled to a first one of the two ear portions;
a second pivot arm coupled to a second one of the two ear portions; wherein
the first and second pivot arms are rotatably coupled to the respective first and second ear portions relative to a second axis perpendicular to the first axis; whereby
the mounting device is configured to move between a first configuration and a second configuration, wherein, in the first configuration, the first and second pivot arms hang vertically relative to the surface and the surface is a mounting plate shaped and configured to attach to a truck bed; and wherein: the bracket is rotatably coupled to the mounting plate.

2. The mounting device of claim 1, wherein:
the mounting plate, bracket, and first and second pivot arms comprise at least one of the following: steel, stainless steel, HSLA steel, aluminum alloy, titanium alloy, and iron.

3. The mounting device of claim 1, wherein:
each of the first and second pivot arms have passages through distal ends thereof, whereby the first and second pivot arms can receive a mounting pin of a ratchet tie-down strap assembly.

4. The mounting device of claim 1, wherein:
the first and second pivot arms are configured to rotate into a second configuration in response to a pulling force applied to the first and second pivot arms.

5. The mounting device of claim 1, further comprising:
a pivot pin rotatably coupling proximal ends of the first and second pivot arms to the bracket.

6. The mounting device of claim 5, further comprising:
a spacer tube encasing a portion of the pivot pin, the spacer tube shaped and configured to maintain a desired spacing between the first and second pivot arms.

7. The mounting device of claim 1, further comprising:
a spacer washer between the first one of the two ear portions and the first pivot arm.

8. The mounting device of claim 1, wherein:
when the mounting device is attached to the truck bed in an upright position, the mounting device is configured to store a ratchet tie-down strap assembly in a hanging position.

9. The mounting device of claim 1, wherein:
the bracket is a u-shaped bracket.

10. A system for anchoring goods to a truck bed, the system comprising:
the mounting device of claim 1, wherein a ratchet tie-down strap assembly coupled to the first and second pivot arms, the ratchet tie-down strap assembly having a ratchet system and a strap for anchoring goods to the truck bed.

11. The system of claim 10, wherein:
the ratchet tie-down assembly is coupled to distal ends of the first and second pivot arms by a mounting pin on a proximal portion the ratchet tie-down assembly, the mounting pin passing through passages in distal ends of the first and second pivot arms.

12. The system of claim 10, wherein:
the first and second pivot arms are configured to rotate into a second configuration in response to a pulling force applied to the ratchet tie-down assembly, whereby the ratchet tie-down assembly is movable from a first hanging position to a second extended, swiveled, tilted position.

13. The system of claim 10, wherein:
the mounting device further comprises a pivot pin rotatably coupling proximal ends of the first and second pivot arms to the u-shaped bracket.

14. The system of claim 13, wherein:
the mounting device further comprises a spacer tube encasing a portion of the pivot pin, the spacer tube shaped and configured to maintain a desired spacing between the first and second pivot arms.

15. The system of claim 10, wherein:
the mounting system further comprises a spacer washer between the first one of the two ear portions and the first pivot arm.

16. The system of claim 10, wherein:
the mounting plate, bracket, and first and second pivot arms comprise at least one of the following: steel, stainless steel, HSLA steel, aluminum alloy, titanium alloy, and iron.

17. The system of claim 10, wherein:
when the system is attached to the truck bed, the mounting device stores the ratchet tie-down strap assembly in a hanging position.

18. A method of anchoring an item to a truck bed, the method comprising:
- provide the mounting device of claim 1;
- provide a ratchet tie-down strap assembly with a proximal end having a mounting pin, a strap, and a ratchet system for the strap;
- attach the first mounting device to a side of a truck bed with the top region vertically above the bottom region;
- couple the proximal end of the ratchet tie-down strap assembly by passing the mounting pin through passages in distal ends of the first and second pivot arms.

19. The method of claim 18, further comprising:
- position an item on the truck bed;
- pull a distal end of the strap from the ratchet tie-down assembly;
- at least one of: attach the distal end of the strap to the item, or attach the distal end of the strap to the truck bed;
- ratchet the ratchet tie-down strap assembly to tension the strap, whereby the first and second pivot arms rotate into a second configuration, and whereby the ratchet tie-down assembly is movable from a first hanging position to a second extended, swiveled, tilted position.

* * * * *